United States Patent
Cook et al.

(10) Patent No.: US 10,452,513 B2
(45) Date of Patent: Oct. 22, 2019

(54) TRACE DATA CAPTURE DEVICE AND METHOD, SYSTEM, DIAGNOSTIC METHOD AND APPARATUS AND COMPUTER PROGRAM

(71) Applicant: ARM LIMITED, Cambridge (GB)

(72) Inventors: Dennis Stephen Cook, Stockport (GB); Anthony Russell Armitstead, Poulton-le-Fylde (GB); Michael Paul Darling, Clitheroe (GB)

(73) Assignee: ARM Limited, Cambridge (GB)

( * ) Notice: Subject to any disclaimer, the term of this patent is extended or adjusted under 35 U.S.C. 154(b) by 30 days.

(21) Appl. No.: 14/976,590

(22) Filed: Dec. 21, 2015

(65) Prior Publication Data

US 2016/0232073 A1 Aug. 11, 2016

(30) Foreign Application Priority Data

Feb. 6, 2015 (GB) .................................. 1501993.8

(51) Int. Cl.
*G06F 11/00* (2006.01)
*G06F 11/34* (2006.01)
*G06F 11/30* (2006.01)

(52) U.S. Cl.
CPC ........ *G06F 11/348* (2013.01); *G06F 11/3065* (2013.01); *G06F 11/3466* (2013.01)

(58) Field of Classification Search
CPC .... G06F 11/36; G06F 11/362; G06F 11/3668; G06F 17/30569; G06F 17/40; G06F 8/24; G06F 8/38; G06F 11/3636; G06F 11/3476
See application file for complete search history.

(56) References Cited

U.S. PATENT DOCUMENTS

| | | | | | |
|---|---|---|---|---|---|
| 5,764,885 | A | * | 6/1998 | Sites | G06F 11/3636 |
| | | | | | 712/201 |
| 6,094,729 | A | * | 7/2000 | Mann | G06F 11/348 |
| | | | | | 714/25 |
| 6,142,683 | A | * | 11/2000 | Madduri | G06F 11/348 |
| | | | | | 703/23 |

(Continued)

FOREIGN PATENT DOCUMENTS

| | | |
|---|---|---|
| GB | 1 378 224 | 12/1974 |
| GB | 2 404 754 | 2/2005 |

OTHER PUBLICATIONS

Search Report for GB 1501993.8, dated Aug. 5, 2015, 3 pages.

*Primary Examiner* — Bryce P Bonzo
*Assistant Examiner* — Jeison C Arcos
(74) *Attorney, Agent, or Firm* — Nixon & Vanderhye P.C.

(57) ABSTRACT

A trace data capture device has trace storage circuitry for storing trace data captured from a data processing apparatus. Detection circuitry detects source identifiers identifying which trace source generated the trace data. Output circuitry outputs to a diagnostic apparatus, independently from the trace data, source identifying data which indicates which source identifiers were detected for the trace data stored in at least a portion of the trace storage circuitry. By allowing the diagnostic apparatus to determine which source identifiers have been detected for which region of the memory, this can allow more targeted uploads of trace data, to reduce the time required for uploading the trace data and reduce the time to determine if data is not present for a particular source.

26 Claims, 7 Drawing Sheets

(56) References Cited

U.S. PATENT DOCUMENTS

| | | | | |
|---|---|---|---|---|
| 6,189,140 B1* | 2/2001 | Madduri | G06F 11/348 | 712/227 |
| 6,314,530 B1* | 11/2001 | Mann | G06F 11/348 | 714/25 |
| 6,763,385 B1* | 7/2004 | Orfali | G06F 11/348 | 709/224 |
| 7,080,283 B1* | 7/2006 | Songer | G06F 11/3636 | 714/30 |
| 7,496,812 B1* | 2/2009 | Azimi | G01R 31/31705 | 710/317 |
| 8,195,977 B2* | 6/2012 | Martin | H04L 41/0659 | 714/4.1 |
| 2005/0039078 A1* | 2/2005 | Bradley | G06F 11/348 | 714/25 |
| 2006/0150023 A1* | 7/2006 | Hasebe | G01R 31/31705 | 714/38.1 |
| 2007/0168997 A1* | 7/2007 | Tran | G06F 11/3664 | 717/129 |
| 2007/0207800 A1* | 9/2007 | Daley | H04L 12/2602 | 455/425 |
| 2008/0127108 A1* | 5/2008 | Ivanov | G06F 11/3476 | 717/128 |
| 2008/0127110 A1* | 5/2008 | Ivanov | G06F 11/3476 | 717/128 |
| 2009/0327809 A1* | 12/2009 | Joy | G06F 11/3636 | 714/26 |
| 2011/0288809 A1* | 11/2011 | Stevens | G01R 31/31705 | 702/122 |
| 2012/0030520 A1* | 2/2012 | Horley | G06F 11/3476 | 714/45 |
| 2012/0166887 A1* | 6/2012 | Horley | G06F 11/348 | 714/45 |
| 2012/0226804 A1* | 9/2012 | Raja | H04L 43/028 | 709/224 |
| 2014/0195786 A1* | 7/2014 | Gilkerson | G06F 11/3476 | 712/227 |
| 2015/0254160 A1* | 9/2015 | Horley | G06F 11/3476 | 714/45 |
| 2016/0232073 A1* | 8/2016 | Cook | G06F 11/348 | |

* cited by examiner

|  | 31 | 24 | 23 | 17 | 16 | 15 | 8 | 7 | 1 | 0 |
|---|---|---|---|---|---|---|---|---|---|---|
| Bytes 3-0 | Data | | ID or Data (B) | | F | Data | | ID or Data (A) | | F |
| Bytes 7-4 | Data | | ID or Data (D) | | F | Data | | ID or Data (C) | | F |
| Bytes 11-8 | Data | | ID or Data (G) | | F | Data | | ID or Data (E) | | F |
| Bytes 15-12 | J H G E D C B A | | ID or Data (J) | | F | Data | | ID or Data (H) | | F |

FIG. 2

|  | 31 | 24 | 23 | 17 | 16 | 15 | 8 | 7 | 1 | 0 |
|---|---|---|---|---|---|---|---|---|---|---|
| Bytes 3-0 | Data 0xA7 | | Data 0x53 | | 0 | Data 0xAA | | ID 0x03 | | 1 |
| Bytes 7-4 | Data 0x52 | | Data 0x2A | | 0 | Data 0xA8 | | ID 0x15 | | 1 |
| Bytes 11-8 | Data 0xCA | | ID 0x03 | | 1 | Data 0x54 | | Data 0x29 | | 0 |
| Bytes 15-12 | 0 0 0 1 1 1 0 0 | | Data 0x64 | | 0 | Data 0xC7 | | Data 0x63 | | 0 |

FIG. 3

NOTE: The padding at the end of trace does not occur for PTF or STOP.
Rationale: For these kinds of data capture, the end of the data capture is not on TPIU frame boundaries anyway.

TRACE DATA CAPTURE DEVICE AND METHOD, SYSTEM, DIAGNOSTIC METHOD AND APPARATUS AND COMPUTER PROGRAM

This application claims priority to GB Patent Application No. 1501993.8 filed 6 Feb. 2015, the entire contents of which is hereby incorporated by reference.

BACKGROUND

Technical Field

The present technique relates to the field of data processing. More particularly, it relates to handling of trace data captured from a data processing apparatus.

Technical Background

A data processing apparatus may have trace circuitry to generate trace data providing information about the processing performed by the apparatus, which can be useful for diagnostic purposes. For example the trace data may indicate the instructions executed or data processed by the processing apparatus, or may indicate when certain events such as exceptions occurred, to help understand the operation of the processing apparatus. The trace data may be captured by a trace data capture device and stored within a trace buffer. A diagnostic apparatus such as a debugger or host computer can read the trace data from the trace buffer within the trace data capture device and analyse the trace data to determine whether the processing apparatus is functioning correctly or efficiently when executing a given program. However, often it can be slow to transfer trace data from the trace data capture device to the diagnostic apparatus.

SUMMARY

At least some embodiments provide a trace data capture device comprising:
  trace storage circuitry to store trace data captured from a data processing apparatus;
  detection circuitry to detect one or more source identifiers for identifying which of a plurality of trace sources of the data processing apparatus generated the trace data; and
  output circuitry to output to a diagnostic apparatus, independently from the trace data, source identifying data indicative of which source identifiers were detected for the trace data stored in at least a portion of the trace storage circuitry.

At least some embodiments provide a data processing system comprising the trace data capture device and the data processing apparatus.

At least some embodiments provide a trace data capture device comprising:
  trace storage means for storing trace data captured from a data processing apparatus;
  detection means for detecting one or more source identifiers for identifying which of a plurality of trace sources of the data processing apparatus generated the trace data; and
  output means for outputting to a diagnostic apparatus, independently from the trace data, source identifying data indicative of which source identifiers were detected for the trace data stored in at least a portion of the trace storage means.

At least some embodiments provide a trace data capture method comprising steps of:
  storing trace data captured from a data processing apparatus;
  detecting one or more source identifiers for identifying which of a plurality of trace sources of the data processing apparatus generated the trace data; and
  outputting to a diagnostic apparatus, independently from the trace data, source identifying data indicative of which source identifiers were detected for the trace data stored in at least a portion of the trace storage circuitry.

At least some embodiments provide a diagnostic method for processing trace data transmitted from a trace data capture device, comprising steps of:
  receiving from the trace data capture device source identifying data indicative of which source identifiers were detected for at least one portion of trace data captured by the trace data capture device from a data processing apparatus, the source identifiers identifying which of a plurality of trace sources of the data processing apparatus generated the trace data;
  processing the source identifying data; and
  in dependence on said processing of the source identifying data, controlling transmission of a trace data request to the trace data capture device to request transmission of at least some of the trace data.

At least some embodiments provide an apparatus comprising:
  trace storage circuitry to store trace data captured from a data processing apparatus;
  detection circuitry to detect one or more source identifiers for identifying which of a plurality of trace sources of the data processing apparatus generated the trace data; and
  circuitry to generate source identifying data indicative of which source identifiers were detected for the trace data stored in at least a portion of the trace storage circuitry.

At least some embodiments provide a computer program for controlling a computer to perform the diagnostic method.

At least some embodiments provide a diagnostic apparatus for processing trace data transmitted from a trace data capture device, comprising:
  receiving circuitry to receive from the trace data capture device source identifying data indicative of which source identifiers were detected for at least one portion of trace data captured by the trace data capture device from a data processing apparatus, the source identifiers identifying which of a plurality of trace sources of the data processing apparatus generated the trace data; and
  processing circuitry to perform processing of the source identifying data, and in dependence on said processing of the source identifying data, to control transmission of a trace data request to the trace data capture device to request transmission of at least some of the trace data.

At least some embodiments provide a diagnostic apparatus for processing trace data transmitted from a trace data capture device, comprising:
  receiving means for receiving from the trace data capture device source identifying data indicative of which source identifiers were detected for at least one portion of trace data captured by the trace data capture device from a data processing apparatus, the source identifiers identifying which of a plurality of trace sources of the data processing apparatus generated the trace data; and processing means for performing processing of the source identifying data, and in dependence on said processing of the source identifying data, and for controlling transmission of a trace data request to the trace data capture device to request transmission of at least some of the trace data Further aspects, features and advantages of the present technique will be apparent from the following description of examples, which is to be read in conjunction with the accompanying drawings.

BRIEF DESCRIPTION OF THE DRAWINGS

FIG. 2 shows an example format of a trace frame output by the data processing apparatus;

FIG. 3 shows an example of interpreting a frame of trace data having the format of FIG. 2;

DESCRIPTION OF EXAMPLES

Figure 1:
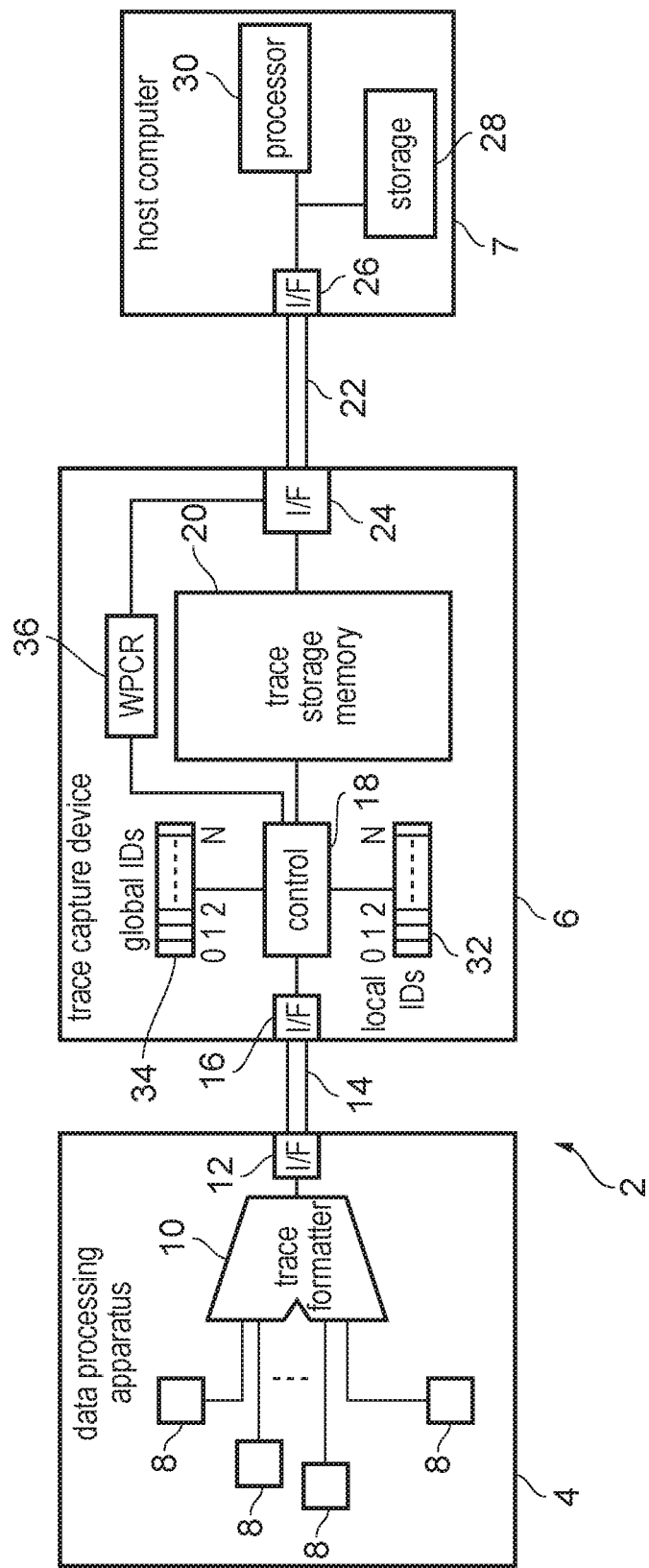
FIG. 1 schematically illustrates an example of a system comprising a data processing apparatus, a trace capture device for capturing trace data output from the data processing apparatus and a host computer for analysing the trace data captured by the trace capture device.

A trace data capture device may have trace storage circuitry for storing trace data captured from a data processing apparatus. Output circuitry may be provided for outputting the trace data to a host computer or other diagnostic apparatus. The interface between the trace capture device and the diagnostic apparatus may have limited bandwidth, and so it can be slow to upload all the trace data stored in the trace storage circuitry to the diagnostic apparatus. For example, for 4 gigabytes of storage, it may take several minutes to transfer all the trace data from the storage to the diagnostic apparatus via a typical transfer medium such as USB (Universal Serial Bus) or Ethernet. While the slow transfer time can be mitigated to some extent by reducing the amount of trace data that is uploaded and instead targeting specific areas of the trace storage for uploading, there are some situations in which this is not practical.

For example, the data processing apparatus which generated the trace data may include a number of different trace sources and the data from multiple trace sources may be multiplexed into a single stream to be output to the trace capture device. For example, the trace sources may correspond to different types of trace data, tracing of different elements of the data processing apparatus, or tracing of different processes running in the data processing apparatus. If one of the sources generates much less trace data than the other sources, it can be difficult to gather the trace data associated with the sparsely emitting trace source without uploading the entire trace storage to the diagnostic apparatus, since the data from that trace source may be distributed across the storage device and swamped by a much larger volume of trace data from other sources, so that a targeted access to a smaller area of the storage circuitry is unlikely to find a significant amount of the data from the sparsely emitting trace source. Therefore, isolating the trace data associated with the sparsely emitting source would typically require all the trace data from the storage device to be uploaded to the diagnostic apparatus and demultiplexed, and this results in a very slow upload time which can provide an unacceptable response in order to retrieve a small amount of data. Also, sometimes the source of interest may not have generated any trace data at all, in which case waiting several minutes only to find there is no relevant trace data can be frustrating for the user.

The trace data capture device may comprise detection circuitry to detect one or more source identifiers which identify which trace source generated the trace data, and output circuitry capable of outputting to the diagnostic apparatus, independently from the trace data, source identifying data indicating which source identifiers were detected for the trace data stored in at least a portion of the trace data circuitry. As the diagnostic apparatus can determine which source identifiers have been detected for the captured trace data, without having to upload the trace data itself, more efficient uploads of trace data can be made. For example, if the source identifying data shows that a source identifier of a desired trace source has not been detected at all, then the diagnostic apparatus does not need to acquire any trace data at all, avoiding a long waiting time for the trace data to be acquired before it can be determined whether there is any relevant trace data. Also, if there is some trace data corresponding to the required source identifier, then the diagnostic apparatus can make a targeted access or targeted accesses to part of the trace storage comprising the trace data associated with the required source identifier, to reduce the amount of data that needs to be uploaded. Either way, the time required to find out whether there is any trace data associated with a particular source can be reduced by several orders of magnitude.

FIG. 1 shows an example of a data processing system 2 comprising a data processing apparatus 4 having trace circuitry for generating trace data, a trace capture device 6 for capturing the trace data output by the data processing apparatus 4 and a host computer 7 (also known as a debugger or a diagnostic apparatus) for analysing trace data captured by the trace capture device 6 for diagnostic purposes such as debugging or software testing. In a trace mode, the host computer 7 may passively observe (trace) the operation of the data processing apparatus 4 by analysing the trace data, which could be generated continuously or in response to certain trigger events occurring within the processing apparatus 4. In a debug mode, the host computer 7 may more actively control the data processing apparatus to perform certain test operations by injecting debug instructions to be executed by the data processing apparatus 4 or debug data to be processed.

The data processing apparatus (which may be a processor, CPU, GPU, for example or any other processing device) may have several sources 8 of trace data. For example, the trace sources 8 could be trace units for tracing different elements of the data processing elements (e.g. different processor cores within a multi-processing system). In other examples, several trace sources 8 may trace the operation of the same processing element, but generate different types of trace data. For example, the sources may include:

an embedded trace macrocell (ETM) which provides non-intrusive cycle accurate program and data tracing, to generate trace data indicating the timings of program instructions and/or data executed by the processing apparatus. The ETM may provide a detailed view of the processing being performed by the processing apparatus.

a program trace macrocell (PTM) which provides trace data tracing the program flow. In contrast to the ETM, the PTM may not trace the timings of each instruction, but may provide information concerning non-sequential program flow so that a trace analyser provided with a copy of the program being executed can reconstruct the program flow. For example, the PTM may trace the occurrence of branches, exceptions and other instructions which change the state of the processor, for example. This reduces the amount of trace data which is generated.

an instrumentation trace macrocell (ITM) may be a software application driven trace source which may output trace data when instructed by software executed by the data processing apparatus. This can be useful for tracing operating system events for example.

a system trace macrocell (STM) may provide trace data relating to communications between devices within an overall system. For example, the system trace macrocell may provide information about the operation of an interconnect which couples several devices together and maintains coherency between the devices. Together with an ETM or PTM associated with individual devices in the system the STM can help to provide visibility of the overall system operation.

In other examples, different trace sources may correspond to different programs, processes or threads executed by the processing apparatus 4. It will be appreciated that these are just some examples of types of trace source.

A trace formatter 10 receives streams of trace data from several trace sources 8 and combines them into a single stream, which is output over an interface 12 and a first transmission medium 14, which may for example be a parallel link, a serial link such as SWO (Serial Wire Output) or a high speed serial link such as HSSTP (High Speed Serial Trace Port). The trace formatter 10 may include source identifiers in the multiplexed trace stream to indicate which source 8 generated each piece of trace data. Where a stream of trace packets relates to the same source, the formatter need not repeat the source identifier for every packet (an example of encoding the source identifiers is discussed below).

The trace capture device 6 receives the trace data from the first transmission medium 14 at an input interface 16, and control circuitry 18 within the trace capture device controls the trace data to be stored within a trace storage memory 20. The trace capture device 6 and host computer 7 are connected via a second transmission medium 22 (e.g. USB or Ethernet). The trace capture device 6 and host computer 7 each have an interface 24, 26 for inputting/outputting data over the transmission medium 22. Hence, the host computer 7 can request upload of trace data from the trace capture device 6, and the received trace data can be stored within data storage 28 in the host computer 7 and/or analysed by processing circuitry 30. It will be appreciated that the system of FIG. 1 is just an example and that other components may be provided. For conciseness the elements of the data processing apparatus 4 that are not used for trace output are not shown, but it will be appreciated that the processing apparatus 4 may have a processor, cache, registers, etc, and other elements known in the art.

The data processing apparatus may generate trace data at a relatively high rate, e.g. 6.4 gigabits per second (Gb/s). The trace storage 20 may support capturing the data at the full rate. The memory may have a reasonable capacity (e.g. 4 GB) so that it can provide bulk storage for trace data so that the host computer 7 does not need to upload the data at the same rate it is generated. The bandwidth of the second transmission medium 22 (e.g. USB or Ethernet) may be less than the rate at which the trace data is generated. For example, with USB2, the top rate achievable currently is around 480 megabits per second (Mb/s), and a typical rate is around 280 Mb/s. Hence the host computer cannot upload the trace data at the same rate as which the trace data is being generated, and so the performance bottleneck in the system of FIG. 1 is typically caused by the second transmission medium 22. While targeted uploads of only some trace data from the trace storage 20 may alleviate this bottleneck, this may not always be possible. For example, in the case where there are multiple trace sources 8, one source (e.g. the ITM or STM discussed above) may generate much less trace data than another trace source such as the ETM or PTM. If the trace formatter 10 multiplexes each stream then the trace data from the ITM or STM or other sparsely emitting source may end up distributed across the trace storage memory 20, as it is swamped by the data being generated by other trace sources. If the user of the host computer 7 only wishes to check the trace data associated with the sparsely emitting source, there may only be a small number of bytes of trace data from that source spread across the whole memory 20. Without any knowledge of which trace data relates to which source, the host computer 7 would have to request the trace capture device 6 to upload all the trace data in the memory 20, so that this can then be demultiplexed based on the source identifiers to locate the stream of trace data associated with the source of interest. However, as the bandwidth on the second transmission medium 22 between the trace capture device and host computer 7 is relatively low, uploading the entire capacity of the memory 20 can be very slow. For example, currently this may take several minutes, which may provide an unacceptably slow response for a debugger. Even worse, it may be that having downloaded all the trace data, it turns out that there is no data associated with the source of interest, in which case time has been wasted in acquiring the trace data which is not of interest.

To address these problems, the control circuitry 18 may comprise detection circuitry to detect source identifiers included within the trace stream received from the data processing apparatus 4, and generate source identifying data tracking the identifiers detected for the trace data in all or part of the memory 20. The source identifying data can be output to the host computer 7, independently from the trace data itself, so that the host computer 7 can determine which source identifiers have been detected for a given area of memory without needing to acquire the trace data itself. Having received the source identifying data, then the host computer 7 can check whether there is any trace data for the required source, and if so, which portions of the memory 20 store the trace data for that source. The host computer 7 can then make targeted accesses to the portions of memory 20 of interest, to avoid needing to acquire all the trace data. This enables the upload time to be reduced significantly. For example, rather than taking over 2 minutes using USB2 to upload 4 GB of trace data using the current fastest method, the source identifying data may be uploaded in less than one second over USB2 and after that a few targeted accesses can be made to smaller regions of memory. The effect on the user experience for these use cases can be transformational.

FIG. 2 shows an example of how the trace formatter 10 can encode source identifiers in the trace data, although it will be appreciated that other encodings could also be used. The trace data may be divided into frames of a certain size, e.g. 16 bytes in the example of FIG. 2. The odd-numbered bytes 1, 3, 5 . . . 13 are used for trace data only. The even-numbered bytes 0, 2, 4, . . . 14 are mixed-use bytes which may represent either trace data or a source identifier (ID) of one of the trace sources 8. For each even-numbered byte, the least significant bit (marked F in FIG. 2) indicates whether that byte represents a source identifier or some trace data. For example, a least significant bit of 0 may indicate that the following 7 bits represent trace data, while a least significant bit of 1 may indicate that the following 7 bits represent a source identifier. This allows 7-bit source identifiers to be identified (i.e. having values in the range 0 to 127, which enables a reasonable number of trace sources to be distinguished). In the absence of a repeated source identifier, the subsequent bytes of trace data may be assumed to relate to the same source as indicated by the most recently encountered source identifier. In some examples, some of the possible source identifier values may be reserved and may not correspond to a real source 8 within the data processing apparatus 4. This may allow the trace formatter 10 to encode other information within the source field, such as trigger identifiers for triggering a certain action at the trace capture device 6 or host computer 7.

Byte 15 of the frame does not provide an additional byte of trace data, but instead encodes a number of auxiliary bits A, B, C, D, E, G, H, J which each correspond to one of the even-numbered bytes 0, 2, 4, 6, 8, 10, 12, 14 respectively.

When the even-numbered byte represents trace data, as the least significant bit is used to signal whether this byte contains data or an identifier, there are only 7 bits left to indicate the data rather than the full eight bits. To allow a full byte of trace data to be encoded, the corresponding auxiliary bit in byte 15 provides the missing bit of trace data. For example, if byte 2 indicates trace data, then bit B shown in byte 15 provides the least significant bit of the byte of trace data, and the upper 7 bits are provided by the upper 7 bits of byte 2.

On the other hand, when the even-numbered byte represents a source identifier, then the corresponding auxiliary bit in byte 15 indicates whether the new source identifier takes effect before or after the subsequent odd-numbered byte of the frame. If the auxiliary bit is 0, then the change of source identifier takes place before the subsequent odd-numbered byte, i.e. the data in the next odd-numbered byte is associated with the new source identifier indicated in the even-numbered byte. If the auxiliary bit is 1, then the change of source identifier takes place after the subsequent odd-numbered byte, i.e. the data in the odd-numbered byte is associated with the previous source identifier which was indicated before the current even-numbered byte. For byte 14, if the byte stores a source identifier, the corresponding auxiliary bit J is reserved and fixed to zero since there is no subsequent odd-numbered byte (byte 15 provides the auxiliary bits), and the new source identifier will take effect from the first data byte of the following frame.

FIG. 3 shows a specific example of some trace data in this frame format, and the following table explains how to interpret the trace data shown in FIG. 3:

| Byte | Comments | Data |
| --- | --- | --- |
| 0 | Bit 0 is set, so this indicates a new ID. The new ID is 0x03. Bit 0 of byte 15 is clear, so the new ID takes effect immediately | — |
| 1 | Data byte corresponding to the new ID. | 0xAA, ID 0x03 |
| 2 | Bit 0 is clear, so this is a data byte. Bit 0 of the data is taken from bit 1 of byte 15. | 0xA6, ID 0x03 |
| 3 | Data byte. | 0xA7, ID 0x03 |
| 4 | Bit 0 is set, so this indicates the new ID. The new ID is 0x15. Bit 2 of byte 15 is set, so the next data byte continues to use the old ID. | — |
| 5 | Data byte. | 0xA8, ID 0x03 |
| 6 | Bit 0 is clear, so this is a data byte. Bit 0 of the data is taken from bit 3 of byte 15. | 0x55, ID 0x15 |
| 7 | Data byte. | 0x52, ID 0x15 |
| 8 | Bit 0 is clear, so this is a data byte. Bit 0 of the data is taken from bit 4 of byte 15. | 0x53, ID 0x15 |
| 9 | Data byte. | 0x54, ID 0x15 |
| 10 | Bit 0 is set, so this indicates the new ID. The new ID is 0x03. Bit 5 of byte 15 is clear, so the new ID takes effect immediately. | — |
| 11 | Data byte. | 0xCA, ID 0x03 |
| 12 | Bit 0 is clear, so this is a data byte. Bit 0 of the data is taken from bit 6 of byte 15. | 0xC6, ID 0x03 |
| 13 | Data byte. | 0xC7, ID 0x03 |
| 14 | 14 Bit 0 is clear, so this is a data byte. Bit 0 of the data is taken from bit 7 of byte 15. | 0xC8, ID 0x03 |
| 15 | Auxiliary bits. | — |

The trace formatter 10 may encode a source identifier whenever the source of the trace data changes. However, sometimes the trace formatter 10 may also repeat the same source identifier periodically even if there is no change of trace source. This can be useful so that the host computer 7 can still determine the source of trace data even if not all the trace data is uploaded. Therefore, in some embodiments the trace formatter 10 may repeat the source identifier at a certain minimum rate, with more frequent changes of source identifier if the source of the trace data changes.

The trace stream received by the trace capture device 6 at the interface 16 may comprise a number of frames in the format shown in FIGS. 2 and 3. The control unit 18 packs the frames of trace data into blocks of a certain size, and stores the blocks to the memory 20.

While processing the frames, the control unit 18 detects the source identifiers encoded in the trace stream, and generates tracking data based on the detected source identifiers. To detect the source identifiers, the control unit 18 tests bit 0 of each even byte within each frame and if this is set to '1' then the remaining bits 7:1 indicate the source identifier. The control unit 18 tracks the source identifiers detected over a certain unit of trace data referred to herein as an accounting period, and generates source identifying data identifying the identifiers detected for that accounting period. The control unit 18 stores the trace data of the accounting period to the memory 20, and also stores the source identifying data. At the end of the accounting period, the control unit 18 starts tracking identifiers for the following accounting period. The size of the accounting period is arbitrary and can be selected depending on implementation requirements. If the accounting period is larger (comprises a larger amount of trace data) then there is less source identifying data per unit trace data and there is less tracking overhead, but the locations in memory 20 of trace data relating to a particular source identifier cannot be pinpointed as precisely. On the other hand, making the accounting period smaller allows more precise location of trace data relating to a particular source, which can help to reduce the time for uploading the required trace data by allowing more targeted accesses, but this requires more overhead in tracking the identifiers and recording the detected identifiers at a finer granularity in the trace storage 20. Hence, there is a trade-off between precision and tracking overheads, the balance of which can be selected by the diagnostic apparatus based on the needs of that system. For example, the diagnostic apparatus may set the size of the accounting period by writing to a configuration register in the trace capture device 6.

The trace capture device 6 includes a local tracking register 32 for recording the source identifiers detected within the current accounting period being processed by the control unit 18, and a global tracking register 34 for recording the source identifiers detected within the memory 20 for the whole of the data capture.

Figure 4:
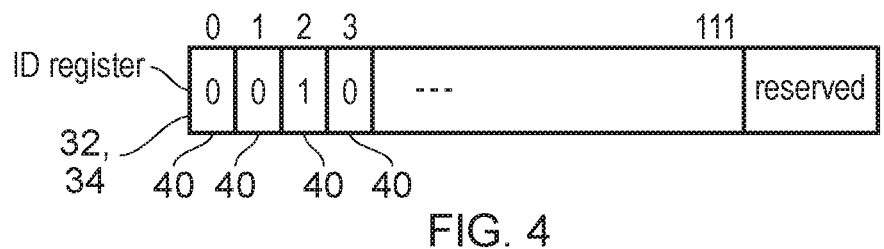
FIG. 4 illustrates an example of a tracking register for tracking detection of source identifiers associated with trace data.

FIG. 4 shows an example of the local tracking register 32 or global tracking register 34 (both have a similar configuration). The registers 32, 34 comprise a number of bit fields 40 each corresponding to a respective value of the source identifiers. In this example, bit fields are provided for source identifiers 0 to 111 (values 112-127 are reserved for other purposes such as trigger identifiers, and the remaining bits of the register may track the detection of these source values). At the start of an accounting period, the control unit 18 resets the local tracking register 32 so that all of the bit fields are 0. While processing the trace data during an accounting period, each time a new source identifier is encountered then the corresponding bit field 40 within the register 32 is set to 1 to indicate that this source identifier has been detected somewhere within this accounting period. At the end of the accounting period, the data from the local tracking register 32 is stored to memory 20 as the source identifying data for that accounting period. At the end of the accounting period, the control unit 18 also updates the global tracking register 34 to reflect any new source identifiers which have been detected for the current accounting period which had not been previously detected for earlier accounting periods. For example, this can be done by combining the values in registers 32, 34 using a logical OR operation and storing the result to the global tracking register 34. At the end of an accounting period, the local tracking register 32 is reset (e.g. setting all bits to 0) ready for tracking the source identifiers for the following accounting period.

Figure 5:
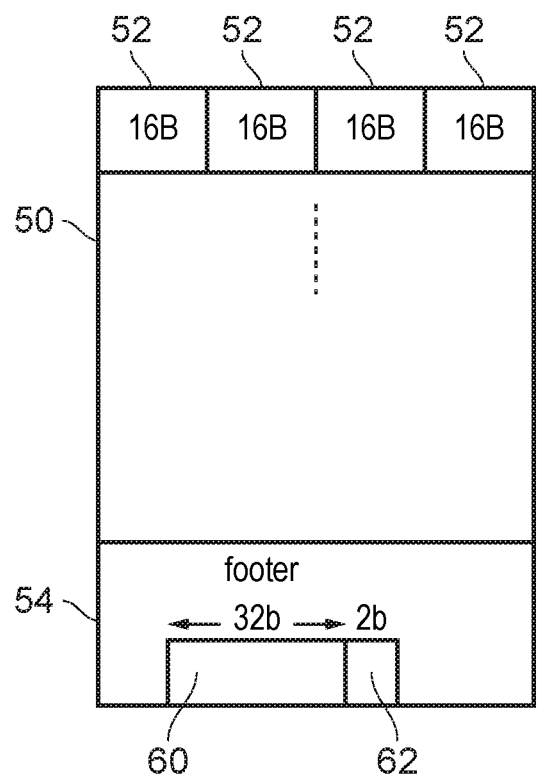
FIG. 5 shows an example of a block of trace data stored by the trace capture device.

FIG. 5 shows an example of a block 50 of trace data stored to memory. The control unit 18 packs the 16 byte frames 52 of trace data of the format shown in FIG. 2 into a larger block 50 of trace data of a certain size, such as 512 bytes. The block 50 includes a footer portion 54 for recording status information. This footer 54 may be used to store the source identifying information indicating which source identifiers have been detected.

If the footer portion includes enough space for indicating flags corresponding to each identifier bit field 40 of the local tracking register 32, then the source identifying data may be stored within the footer 60 of the final block 50 of the same accounting period to which the source identifying data relates.

On the other hand, some implementations may use an existing trace format to be compatible with other devices, and one block in this format may not have enough space in the footer 54 for storing the source identifier indicators for all possible values of the source identifier. For example, as shown in FIG. 5 there may only be a spare 32-bit field 60 within the footer and encoding the contents of the local tracking register 32 may require 128 bits (or at least the 112 bits of the bit fields relating to valid source identifiers). In this case, the source identifying information can be split over several blocks of the accounting period with each block including partial identifier tracking information which tracks whether a particular subset of the identifiers has been detected during the accounting period. A second field 62 may then indicate which subset of the identifiers is being indicated in the current block (if this is not implicit from the ordering of the blocks, if it is implicit then the field 62 may not be required).

Figure 6:
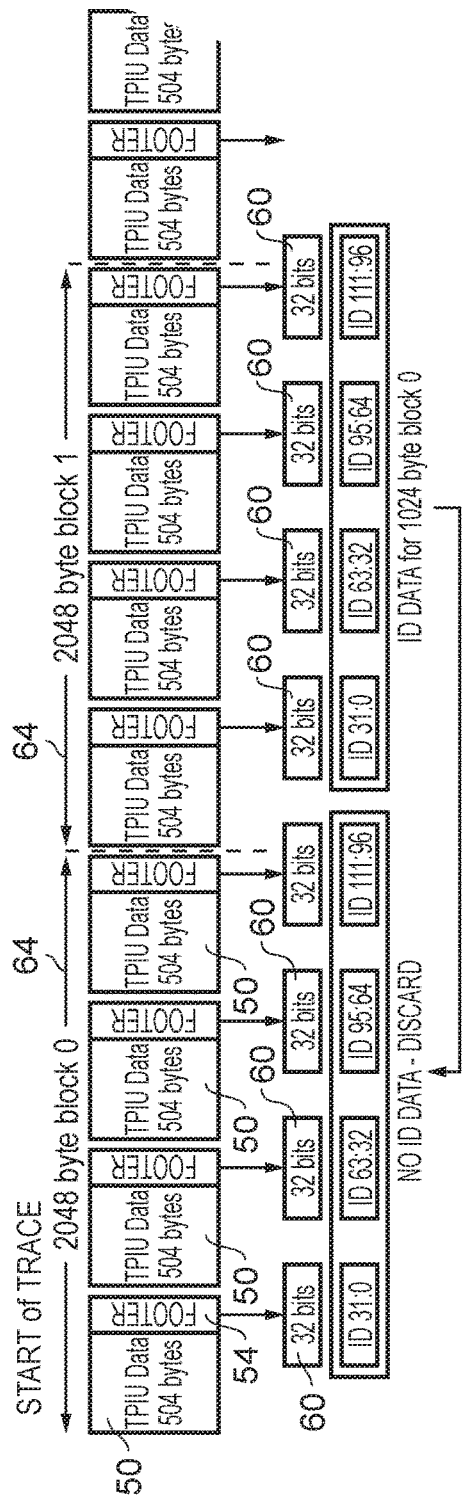
FIGS. 6 and 7 show an example of specifying source identifying data within the trace data stored by the trace capture device.

For example, FIG. 6 shows an example of spreading the source identifying information across an accounting period 64 comprising 4 blocks 50, with each block 50 including 32 bits 60 in the footer 54 corresponding to a respective subset of the identifiers (e.g. the first block can indicate whether any of identifiers 0 to 31 have been detected, and similarly the second, third and fourth blocks may correspond to identifiers 32 to 63, 64 to 95 and 96 to 111 respectively). However, this means that when the first block of the accounting period is generated, it is not yet known whether any of identifiers 0 to 31 may still be detected for the subsequent three blocks of that accounting period. It may be possible to go back and write the source identifying information 60 to previous blocks 50 of trace data already stored to memory once all the blocks of that accounting period have been processed and the complete set of identifiers detected for the accounting period is known. However, this may make the control unit 18 more complex and it may be more efficient to allow the trace data to be stored sequentially into the memory 20 in a single stream, rather than going back and forth to update discontinuous pieces of data.

To support continuous writing to memory, the source identifying information relating to one accounting period 64 can be stored within the footers 54 of the blocks of the following accounting period 64 rather than the blocks of the same accounting period 64. As shown in FIG. 6, for the first accounting period 64 generated at the start of trace, there is no valid identifying data because there was no previous accounting period, and so the local tracking data may still be set to all 0s. Therefore, the blocks of the first accounting period 64 may not contain any valid identifying data, or could have the identifier fields 60 all set to 0, and when this is read by the host computer 7 then the invalid identifying information could be discarded. For each subsequent accounting period 64, the identifying information in fields 60 indicates which source identifiers were detected for the preceding accounting period 64, as shown in FIG. 6, with each block 50 storing partial identifying information relating to a certain subset of identifiers.

Figure 7:
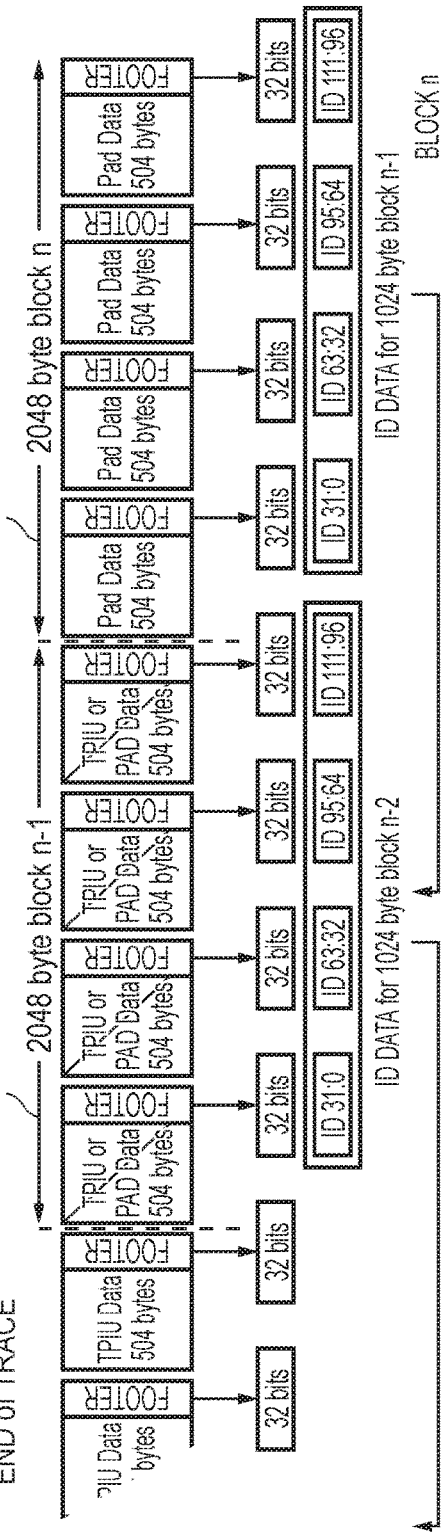

As shown in FIG. 7, at the end of trace, the final accounting period 64-F may only be partially filled with trace data and the remaining space of that accounting period 64-F can be padded with padding data (e.g. a predetermined value indicating that this trace data is not valid). The final accounting period 64-F includes the source identifying information 60 for the previous accounting period, but then the source identifying information 60 for the final accounting period 64-F still needs to be stored, and so one additional accounting period 64-X may be generated containing padding data and the source identifying data 60 for the final accounting period 64-F.

Hence, the approach shown in FIGS. 6 and 7 allows the source identifying data to be encoded within the blocks of trace data even if there is not enough space in the footer 54 of each block to encode all the source identifying data for one accounting period.

At the end of trace, the control unit 18 may store an address of the location of the last piece of trace data stored to the memory 20 in a control register 36 known as a write position capture register (WPCR). This marks the end of the set of trace data relating to a particular trace run, to distinguish it from trace data from earlier trace runs which may still be stored in the memory 20 and may run past the end of the current trace run so that it was not overwritten by the current trace run.

The host computer 7 can send a request for source identifying data to the trace capture device over the transmission medium 22. The source identifier request may have a similar format to a normal read request. For a read request, the host computer 7 may specify a start address and an end address of the region of memory 20 to be read, and the memory 20 may then return the trace data stored in the specified region and output this over the interface 24 to the host computer 7. A similar mechanism may be used to read the source identifying data. The host computer 7 may specify the start and end addresses of a region of memory 20 for which source identifying information is to be read. The host computer 7 may set a bit of the request or a value in a control register of the trace capture device 6 to distinguish the source identifier request from a trace read request. In response to the source identifier request, the trace storage memory 20 performs a burst memory access in which the start address is offset by a number of bits corresponding to the location of the source identifying information within the footer portion 54 of each block 50 of trace data, so that the first data is read is the source identifying information 60. The memory reads the 32 bits of the source identifying information (and if necessary, the 2-bit field 62 indicating which subset of identifiers is indicated by these 32 bits), and then moves on to the next block and does the same, and keeps going until reaching the end address. The memory controller may pack the source identifying information read in this way into a 512 byte block of the same size and similar format to the one used with trace data shown in FIG. 5, except that no footer 54 may be required for the source identifying information and instead the entire block 50 may be filled with source identifying data. However, the block will relate to a larger region of memory compared to a block of trace data of the same size.

With the example discussed above (assuming the 2-bit field 62 is not transmitted to the host computer 7), the source identifying data comprises 32 bits per block of trace data as opposed to 512 bytes per block when sending the trace data itself, i.e. 128 times less data, so the source identifying data can be uploaded several orders of magnitude faster.

One or more blocks of source identifying information are transmitted over medium 22 to the host computer 7, which extracts the source identifying data and interprets it to establish a map of the identifiers relating to the specified area of memory. The host computer 7 may be aware that the source identifying information at one address may actually relate to the trace data at the preceding address, if the encoding of FIGS. 6 and 7 is used. In this way, the host can determine which areas of the trace storage 20 relate to which identifier and can then make targeted memory access requests specifying addresses of particular regions of the memory, in order to obtain trace data relating to a particular source identifier or group of source identifiers.

The host computer 7 may also be able to request transfer of the global tracking information from the global tracking register 34, which indicates the identifiers detected for the whole of the data capture.

Sometimes a particular trace stream sent from the data processing apparatus 24 may not fill the entire memory 20. A previous trace run may have caused a larger amount of data to be placed in memory and this may not all have been overwritten. This may not be a problem for the trace upload itself since some systems may provide an end of trace marker or may ensure that the trace data will end on a boundary of a block 50 or accounting period 64 to ensure that a trace request from the host 7 cannot cause a mix of the old and new trace data to be returned.

However, when the source identifying data is packed into a block 50 of the same size as the trace data, then the existing mechanisms for distinguishing old and new trace data may not be enough, since even if the trace data for the current trace run finishes at a block boundary or accounting period boundary, the corresponding identifying data when packed into the same size block 50 may finish part way through the block and the identifiers after that may relate to a previous capture event. This could lead to the host computer 7 thinking that there is a particular source identifier present when in fact this relates to a previous trace run which is no longer relevant. To prevent this, the WPCR 36 provides information indicating the location of the last valid trace data from the current trace run, and when transferring the source identifying data, either the WPCR value from register 36 can be sent to the host computer 7 so that the host computer can determine the point beyond which the source identifying data should be ignored, or the WPCR value 36 could be used to prevent identifying data beyond this position being transmitted to the host computer 7 at all.

Figure 8:
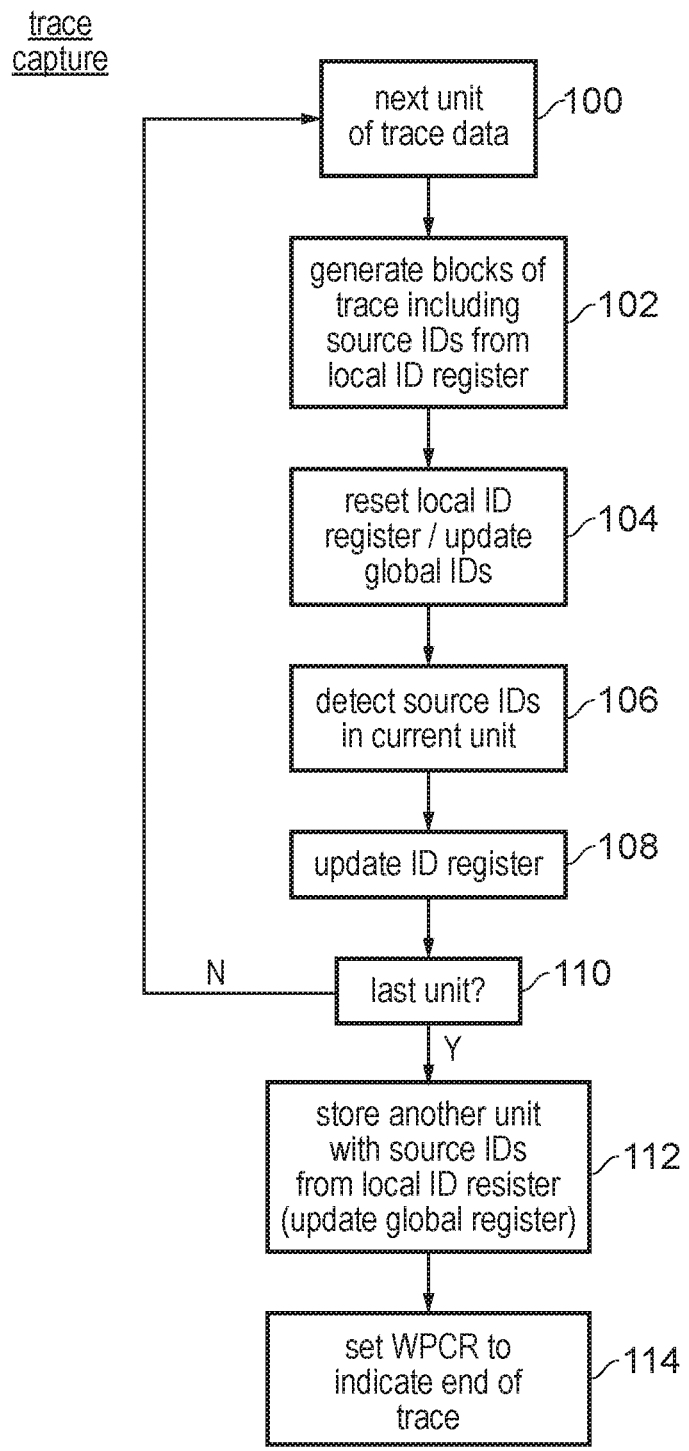
FIG. 8 illustrates a method of capturing trace data and tracking detected source identifiers.

FIG. 8 shows an example of a method of capturing trace data. At step 100, the next accounting period 64 (unit of trace data) starts to be captured. At step 102 the control unit 18 packs the received frames of trace data into blocks to be stored to memory 20, and includes source identifying information 60 indicating the bit values which were present in the local tracking register 32 at the start of processing the current accounting period. Generally these will indicate the identifiers detected for the previous accounting period, but for the first accounting period the identifier bit fields may all be zero or be set to an invalid value. At step 104, the local tracking register 32 is reset for the start of the accounting period and also the old values from the local tracking register 32 are used to update the global tracking register 34. At step 106 the control unit 18 detects source identifiers in the current accounting period, and at step 108 updates the bits of the local tracking register 32 to indicate the identifiers detected. When the accounting period is complete, at step 110 it is determined whether or not this is the last accounting period. If not then the method returns to the step 100 where another accounting period begins to be processed. If the current unit is the last one then at step 112 one more accounting period is generated to store the source identifiers from the last accounting period, and again the global register is updated. At step 114 the WPCR 36 is updated to indicate the end of trace.

It will be appreciated that in some cases the steps of FIG. 8 could be performed in a different order. For example a backup copy of the local tracking register 32 may be made so that the steps 104 to 108 for detecting the source identifiers within the current accounting period and updating the local tracking register 32 can be performed in parallel with step 102 of generating blocks of trace data and storing them to memory, which may still require the old value from the local tracking register 32 relating to the previous accounting period.

Figure 9:
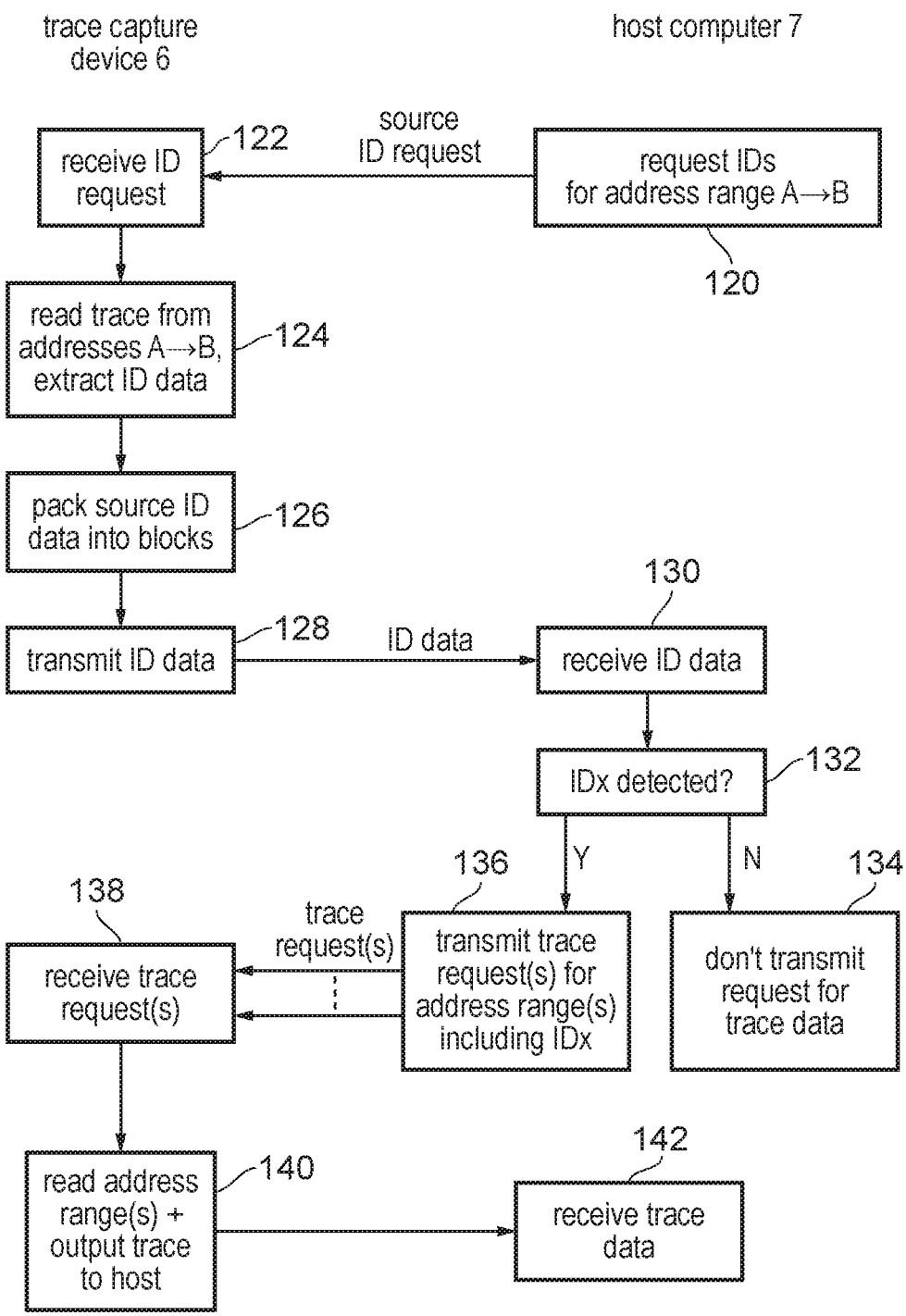
FIG. 9 shows a method of uploading trace data to the host computer.

FIG. 9 shows a flow diagram illustrating a method of trace upload. At step 120 the host computer 7 requests the source identifying data for a particular address range, or for the memory 20 as a whole. The request is sent to the trace capture device 6 which receives the request at step 122. At step 124 the memory 20 reads the trace blocks within the specified address range and extracts the source identifying data from these blocks. At step 126 the extracted source identifying data is packed into blocks which are transmitted to the host computer at step 128. The identifying data is received by the host computer at step 130. At step 132 the host computer analyses the received source identifying data and checks whether a required source identifier IDx is detected. If not, at step 134 no trace request is sent. Hence there is no need to upload any trace data at all if the required source identifier has not been detected, which is much faster than previous techniques which required uploading of the trace data itself in order to find out whether the required source has generated any trace data.

If the required identifier is detected then at step 136 the host transmits one or more trace requests for one or more specified address ranges which have been determined to include trace data relating to the required source identifier IDx. These trace requests are received at step 138 by the trace capture device 6, and at step 140 the required ranges of addresses are read and the trace data from these regions of the memory are output over the transmission medium 22 to the host. At step 142 the host receives the trace data and can process this using any known method in order to determine information about the operation of the data processing apparatus 4.

In summary, the host computer 7 acting as a diagnostic apparatus may receive source identifying data and process it to determine how to control transmission of trace data requests for trace data. For example, the processing and control steps may include determining whether a selected source identifier was detected at all in at least one portion of the trace data and then inhibiting transmission of the trace data request if the selected source identifier was not detected, or could include determining specified portions of the trace data for which a selected source identifier was detected, and triggering transmission of one or more trace data requests to the trace data capture device to request transmission of these specified portions of the trace data. By targeting uploads of trace data in this way, and avoiding uploads at all if this is not necessary, the upload can be made much faster, for example in seconds rather than several minutes.

The address range specified in the trace requests by the host computer 7 at step 136 may account for the fact that the source identifying data for one address actually relates to the trace data at the preceding address, when an encoding similar to the one shown in FIGS. 6 and 7 is used. Also, in some cases the host computer 7 may specify a wider address range than the region which has actually been determined to include trace data corresponding to a particular source. This may account for potential inaccuracy of the source identifying data. For example, the source identifier may not be repeated in each frame of the trace data output by the data processing apparatus 10, and so in the first frame of an accounting period there may be some bytes of trace data which relate to a source whose identifier was only encoded in a previous frame within an earlier accounting period, and so the local tracking information for the new accounting period may not record the source identifier of these first few bytes of the accounting period. Also, even if byte 0 of the first frame of the new accounting period does provide a source identifier, as discussed in FIGS. 2 and 3 the new source identifier may take effect after the subsequent byte 1 of trace data depending on the value of the corresponding auxiliary bit. If the new identifier only takes effect after byte 1, then byte 1 relates to a source whose identifier was indicated in the previous accounting period and so again this may not be tracked by the source identifying information for the new accounting period. While the control unit 18 could track these kinds of occurrences to ensure that the source identifying data is completely accurate, in practice these occurrences may not happen often and the overhead of tracking them may not be justified. In any case, as the trace capture device 6 and host computer 7 cannot control how often the source identifiers are repeated in the trace stream generated by the data processing apparatus 4, to guard against identifiers not being repeated often enough, the host computer 7 may already tend to specify a larger address range than the range of interest, to increase the likelihood that source identifiers are captured for all trace data within the range of interest. Therefore, a small amount of inaccuracy in the source identifying data may not be a problem.

FIG. 1 shows an example where the trace capture device 6 is separate from the data processing apparatus 4. However in other examples the trace capture device may be an on-chip device or may be part of the same circuit board or system on chip as the data processing apparatus 4. For example some data processing apparatuses may have a local buffer for capturing trace data and the technique of detecting source identifiers and recording source identifying information indicating the detected source identifiers may be performed within the on-chip buffer rather than in a separate device. Hence, in some examples the trace data capture device may be part of the data processing apparatus generating the trace data.

The above examples describe detecting the source identifiers as trace data is received from the data processing apparatus 4, before writing the trace data to the memory 20. However, other examples could first store the trace data to memory 20 and then detect the source identifiers from the stored trace data. Also, the above examples describe a trace format in which the source identifiers are encoded within the trace data itself by the trace formatter 10. However, other examples could provide the source identifiers separately from the trace data, e.g. transmitted over a separate path of the interface 12, 14, 16. In this case, the control unit may detect source identifiers provided separately from the trace data.

The examples above discuss recording the source identifying data along with the trace data itself in the memory 20. However, this is not essential. In other examples, the source identifying data could be stored independently of the trace, in some way which allows the correspondence between the source identifying data and the corresponding trace data to be determined. For example, the source identifying data could be placed in a separate memory from the trace storage 20. Also, in some examples the source identifying data could be streamed to the host computer 7 while the trace data is being captured and so may not be stored locally by the trace capture device 6 at all. For example, when capture of an accounting period is finished, the contents of the local ID register 32 could be transmitted to the host computer 7. The host computer 7 may then accumulate within its storage 28 a data structure providing a map of the identifiers detected for each region of the trace storage memory 20. In this case the host computer 7 may not need to actively request transmission of source identifying data, since it will already have the source identifier map and can use this to make targeted accesses of trace data from specified regions of the memory 20.

Also, some embodiments may not provide both the local tracking register 32 and the global tracking register 34 as shown in FIG. 1. In some examples, the global tracking register 34 can be omitted so that the only source identifying information provided is the local information concerning particular units of trace data within the memory. Other systems may not provide any local tracking of trace data for particular units of trace data, and instead source identifier detection may be performed globally for the trace data capture as a whole (effectively the accounting period may comprise the entire trace stream). Providing only the global source identifying information can still be useful to allow trace upload to be omitted altogether if a desired source identifier has not been detected for any part of the stored trace data.

Some systems may track the identifiers detected for a unit of trace data without providing the local tracking register discussed above. For example, it may be possible to record a list of each identifier detected. The local tracking register can be useful because it allows the detected identifiers to be recorded more efficiently using only a single bit per identifier. However, if only a few different source identifiers are expected to be detected within the accounting period, then for example recording a list of a few 7-bit identifiers detected may require less storage than a 112-bit register with one bit per identifying value. Hence, the system designer may select which technique to use for tracking the source identifiers depending on the number of source identifiers in the trace stream.

The source identifying data uploaded to the host computer 7 need not be in the same form as the source identifying data stored by the trace capture device 6. For example, some post processing of the stored source identifying data could be applied prior to upload, for example to change the granularity with which the source identifying data indicates the source identifiers detected within the trace data. Hence, some post-processing circuitry (e.g. the control unit 18 or some further circuitry) may be provided for applying at least one post-processing operation to the local tracking information stored for two or more units of trace data in the trace storage circuitry, to generate aggregated source identifying data, and the aggregated source identifying data can be output to the host computer 7 (diagnostic apparatus).

For example, to trade off reduced upload time against accuracy, the source identifying data for two or more accounting periods could be combined (e.g. using a bitwise OR operation) to indicate the source identifiers detected for the group of accounting periods as a whole. This allows different granularities of the source identifying information to be selected even if the trace capture device 6 stores the source identifying data at a certain default granularity. For example the host computer 7 could specify the particular granularity required for upload, e.g. by setting a control parameter in a configuration register which selects the number of accounting periods whose source identifying information is combined for upload.

Another type of post processing of the trace data may be to create the global source identifying data from the stored source identifying data, so that it is not necessary to provide a global ID register 34 as in the examples shown above. For example, the trace capture device 6 may combine the local source identifying information for each accounting period stored in the memory 20 in order to generate the global source identifying information (although source identifying information from addresses beyond the end point marked in the WPCR 36 can be omitted from the post-processing). This approach can be particularly useful if the trace storage memory 20 is used as a circular buffer so that when the memory 20 is full, the data wraps at the top of the memory and starts to overwrite the trace data at the start of memory. In this case, the global ID register 34 created on the fly may not reflect the IDs actually stored in the memory 20 since some may have been overwritten. In this case, creating the global source identifying data by post-processing the local source identifying data stored in the memory 20 may more accurately reflect the identifiers detected for the trace data stored in the memory 20. The generated global source identifying data can be transferred to the host computer 7 instead of, or in addition to, local source identifying data for smaller blocks of trace data.

It can be very useful to allow the host computer 7 to make targeted accesses to specific portions of the trace data stored in the memory 20, so that the upload time can be reduced when the required source identifier is only detected for some regions of the memory. However, even if the host can only make requests for all the trace data to be uploaded together, the present technique of tracking the source identifiers is still useful since this allows the host to avoid making a request for trace data at all if the source identifier for the required source has not been detected at all.

While in the examples above the processing apparatus may specify particular address ranges for which source identifying data should be transmitted from the trace capture device 6, other systems may not support targeted transfer of source identifying data (even if they do support targeted requests for trace data), and may only support transmitting all the source identifying data stored in the memory 20 to the host computer 7. The extra overhead of controlling accesses to specific parts of the source identifying data may not be justified if in practice the host computer 7 tends to request all the source identifying data in one go anyway.

When uploading the source identifying information to the host computer 7, a memory controller or the interface 24 (acting as output circuitry) may read a number of discontinuous parts of the trace data storage to extract the local tracking information from a number of units and then may output the extracted information to a diagnostic apparatus. The local tracking information can be condensed into a smaller number of packets since it is not necessary to include the intervening trace data. For example a burst memory access can be used to read out all the required tracking information. The extracted local tracking information can be packed into packets of the same size as that used to output the trace data to the diagnostic apparatus. This can make implementation simpler because packet counting and control methods used by the interface between the trace capture device and the diagnostic apparatus can be similar for both trace data transfer and transfer of the source identifying information. However, other systems need not do this and could use a different block size for outputting the source identifying data compared to the trace data.

The host computer 7 need not always use the source identifying data to determine whether to perform trace uploads. For example, the host computer 7 may have a setting which controls whether use of the source identifying data is enabled or disabled. When disabled, when the host computer 7 wishes to access a particular region of the trace storage 20 then it can simply perform trace requests to read the specified regions of memory without first obtaining the source identifying data. For example, if all of the trace sources 8 are generating similar amounts of trace data then it may be unlikely that different regions of memory 20 will have different relative amounts of the trace data from each source and so the host computer 7 may still need to acquire a significant amount of trace data from the memory 20 in order to demultiplex the streams. In this case, the additional upload of the source identifying data may merely incur an overhead with little benefit in reducing the amount of trace data uploaded, and so disabling at least one of generating the source identifying data at the trace capture device 6 and transmitting the source identifying data to the host computer 7 can make the overall processing more efficient. The use of the source identifying data can be re-enabled when there is a situation where one source emits much less data than other sources. Enabling and disabling the use of source identifying information may be controlled by the user of the host computer 7 or automatically controlled by debug software executing on the computer 7.

In some implementations the upload of the source identifying data may be performed automatically by the software executed by the host computer 7 without user intervention. For example the user may simply set which source 8 is of interest and then may instruct the host computer 7 to upload the trace data from this source and then the host may automatically generate a request for source identifiers, analyse the identifiers to identify specified regions of the memory to upload, and then initiate targeted memory accesses to the specified regions. Hence, if the desired source identifier is not present then the host computer 7 can provide a quick response to the user informing the user that there is no trace data from that source, and if there is some trace data for this source, then the corresponding trace data can be obtained quickly with a targeted access so that the user sees a very quick response. However, other examples may make the source identifying information visible to the user, and the user may select the required regions of trace data for upload based on the source identifying information.

In some examples, the trace capture device and diagnostic apparatus may be combined so that a single device captures and stores the trace data output by the data processing apparatus and analyses the stored trace data. In this case, even though there is no second transmission medium, it can still be useful for the combined apparatus to detect source identifiers in the captured trace data and generate the source identifying data indicating which source identifiers were detected, so that subsequent accesses to the stored trace data relating to a particular source identifier can be made faster. For example, by generating the source identifying data as the trace data is being stored, when trace data is later required for a particular source, the apparatus can simply access targeted regions of the memory rather than having to read all the data in the memory to identify which parts have the required source identifiers.

Hence, an apparatus may be provided which comprises trace storage circuitry for storing trace data captured from a data processing apparatus, detection circuitry to detect one or more source identifiers for identifying which of a plurality of trace sources of the data processing apparatus generated the trace data, and circuitry to generate source identifying data indicative of which source identifiers were detected for the trace data stored in at least a portion of the trace storage circuitry. This apparatus may correspond to either the trace capture device on its own, or to the combined trace capture device/diagnostic apparatus which also analyses the trace data.

Figure 10:
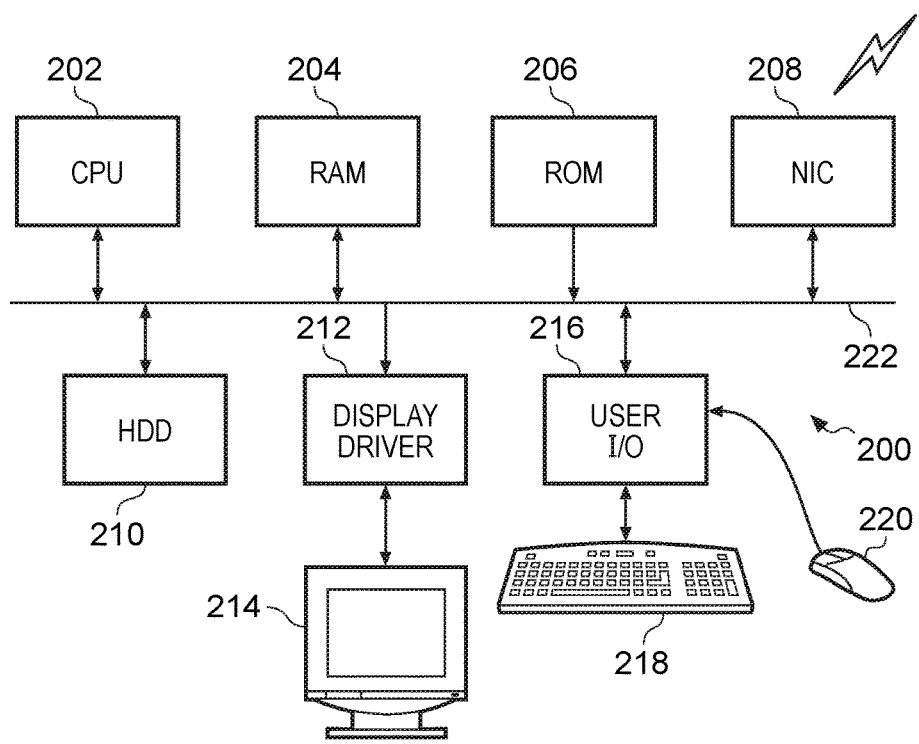
FIG. 10 schematically illustrates a general purpose computer which when executing software may provide the functionality of the host computer.

FIG. 10 schematically illustrates a general purpose computer 200 of the type that may be used to implement the host computer 7 described above. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 executes computer program instructions for controlling debug operations and trace analysis, that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 10 is only one example. Alternatively, the above-described techniques may be implemented in a more distributed fashion, wherein the general purpose computer 200 illustrated in FIG. 10 may be expanded and/or replaced by an infrastructure comprising components implemented on separate physical devices, the separate physical devices sharing the processing required to carry out these techniques. Such separate physical devices may be physically proximate to one another, or may even be located at entirely different physical locations. In some configurations such an infrastructure is termed a 'cloud computing' arrangement.

Hence, a computer program may be provided for controlling a general purpose computer to function as the diagnostic apparatus (host computer). The computer program may be recorded on a recording medium which may be transitory or non-transitory.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes and modifications can be effected therein by one skilled in the art without departing from the scope of the appended claims.

We claim:

1. A trace data capture device comprising:
   a first interface to receive trace data captured from a data processing apparatus, wherein said data processing apparatus is a separate device from said trace data capture device;
   trace storage circuitry to store the trace data captured from a data processing apparatus;
   detection circuitry to detect one or more source identifiers for identifying which of a plurality of trace sources of the data processing apparatus generated the trace data; and
   output circuitry to communicate with a diagnostic apparatus over a second interface, where the diagnostic apparatus is a separate device from said trace data capture device; and
   said second interface has a smaller bandwidth than said first interface;
   wherein said output circuitry is configured to output to the diagnostic apparatus via the second interface, independently from the trace data, source identifying data indicative of which source identifiers were detected for the trace data stored in at least a portion of the trace storage circuitry,
   wherein in response to a request for source identifying data, the output circuitry is configured to output the source identifying data without outputting the trace data.

2. The trace data capture device according to claim 1, wherein in response to a trace data request from the diagnostic apparatus specifying a target portion of the trace storage circuitry, the output circuitry is configured to output the trace data stored in the target portion.

3. The trace data capture device according to claim 1, wherein the source identifying data comprises global source identifying data indicating which source identifiers were detected for the trace data captured from the data processing apparatus.

4. The trace data capture device according to claim 3, wherein in response to a request from the diagnostic apparatus, the output circuitry is configured to output the global source identifying data.

5. The trace data capture device according to claim 1, wherein the source identifying data comprises local source identifying data indicating, individually for at least one portion of the trace storage device, which source identifiers were detected for the trace data stored in that portion.

6. The trace data capture device according to claim 5, wherein in response to a source identifying data request from the diagnostic apparatus specifying one or more target portions of the trace storage circuitry, the output circuitry is configured to output to the diagnostic apparatus the local source identifying data for each of said one or more target portions.

7. The trace data capture device according to claim 1, wherein the detection circuitry is configured to maintain local tracking information indicative of which source identifiers are detected for a current unit of trace data captured from the data processing apparatus.

8. The trace data capture device according to claim 7, wherein following capture of the current unit of trace data, the detection circuitry is configured to reset the local tracking information.

9. The trace data capture device according to claim 7, wherein following capture of the current unit of trace data, the output circuitry is configured to output the local tracking information for the current unit of trace data to the diagnostic apparatus.

10. The trace data capture device according to claim 7, wherein following capture of the current unit of trace data, the detection circuitry is configured to store the local tracking information for the current unit of trace data to the trace storage circuitry or to further storage circuitry.

11. The trace data capture device according to claim 10, comprising post-processing circuitry to apply at least one post-processing operation to the local tracking information stored for two or more units of trace data in the trace storage circuitry, to generate aggregated source identifying data; and
    the output circuitry is configured to output the aggregated source identifying data to the diagnostic apparatus.

12. The trace data capture device according to claim 10, wherein the detection circuitry is configured to store the local tracking information within the trace data stored in the trace storage circuitry.

13. The trace data capture device according to claim 10, wherein the detection circuitry is configured to store the local tracking information for the current unit of trace data within a following unit of trace data captured from the data processing apparatus.

14. The trace data capture device according to claim 13, wherein following capture of a final unit of trace data from the data processing apparatus, the detection circuitry is configured to generate at least one further unit to be stored to the trace storage circuitry, the at least one further unit comprising the local tracking information for the final unit of trace data.

15. The trace data capture device according to claim 13, wherein each unit of trace data stored in the trace storage circuitry comprises a plurality of blocks, each block comprising partial local tracking information corresponding to a subset of the source identifiers and indicative of which of the corresponding subset of the source identifiers was detected for the previous unit of trace data.

16. The trace data capture device according to claim 12, wherein in response to a source identifying data request from the diagnostic apparatus specifying one or more target portions of the trace storage circuitry, the output circuitry is configured to extract the local tracking information from the units of trace data within said one or more target portions and to output the extracted local tracking information to the diagnostic apparatus.

17. A trace data capture device comprising:
    trace storage circuitry to store trace data captured from a data processing apparatus;
    detection circuitry to detect one or more source identifiers for identifying which of a plurality of trace sources of the data processing apparatus generated the trace data; and
    output circuitry to output to a diagnostic apparatus, independently from the trace data, source identifying data indicative of which source identifiers were detected for the trace data stored in at least a portion of the trace storage circuitry;

wherein in response to a request specifying a target address range of the trace storage circuitry:
  when the request is a request for trace data, the output circuitry is configured to output packets comprising the trace data associated with the target address range; and
  when the request is a request for source identifying data, the output circuitry is configured to output packets comprising the source identifying data associated with the target address range, without outputting the trace data associated with the target address range; and
in response to the request for source identifying data, the output circuitry is configured to pack the source identifying data into packets of the same size as packets used to output the trace data in response to the request for trace data,
wherein each packet output in response to the request for source identifying data comprises source identifiers associated with a larger address range of the trace storage circuitry than the address range associated with the trace data of one packet output in response to the request for trace data.

18. The trace data capture device according to claim 1, comprising a storage element to store position information indicative of a position of the last valid trace data stored to the trace storage circuitry.

19. The trace data capture device according to claim 18, wherein when outputting the source identifying data, the output circuitry is configured to:
  output the position information to the diagnostic apparatus, or
  inhibit transmission of the source identifying data relating to a portion of the trace storage circuitry beyond the position indicated by the position information.

20. A data processing system comprising the trace data capture device according to claim 1, and said data processing apparatus.

21. A trace data capture method comprising steps of:
  storing trace data captured from a data processing apparatus via a first interface of a trace data capture device, where said data processing apparatus is a separate device from said trace data capture device, the trace data capture device comprising output circuitry to communicate with a diagnostic apparatus over a second interface, where the diagnostic apparatus is a separate device from said trace data capture device, and said second interface has a smaller bandwidth than said first interface;
  detecting one or more source identifiers for identifying which of a plurality of trace sources of the data processing apparatus generated the trace data; and
  outputting to the diagnostic apparatus via the second interface, independently from the trace data, source identifying data indicative of which source identifiers were detected for the trace data stored in at least a portion of the trace storage circuitry,
  wherein in response to a request for source identifying data, the output circuitry is configured to output the source identifying data without outputting the trace data.

22. A diagnostic method for processing trace data transmitted from a trace data capture device, comprising steps of:
  issuing, from a diagnostic apparatus, a source identifying data request to the trace data capture device over a second interface of the trace data capture device, the trace data capture device also having a first interface to receive trace data captured from a data processing apparatus, where said data processing apparatus is a separate device from said trace data capture device, said diagnostic apparatus is a separate device from said trace data capture device, and said second interface has a smaller bandwidth than said first interface; and
  in response to the source identifying data request, receiving from the trace data capture device via the second interface source identifying data indicative of which source identifiers were detected for at least one portion of trace data captured by the trace data capture device from a data processing apparatus, the source identifiers identifying which of a plurality of trace sources of the data processing apparatus generated the trace data, wherein the source identifying data is received by the trace data capture device without receiving the trace data;
  processing the source identifying data; and
  in dependence on said processing of the source identifying data, controlling transmission of a trace data request to the trace data capture device to request transmission of at least some of the trace data via the second interface.

23. The method according to claim 22, wherein the processing step comprises determining whether a selected source identifier was detected for said at least one portion of the trace data, and the controlling step comprises inhibiting transmission of the trace data request if the selected source identifier was not detected.

24. The method according to claim 22, wherein the processing step comprises determining one or more specified portions of the trace data for which a selected source identifier was detected, and
  the controlling step comprises triggering transmission of one or more trace data requests to the trace data capture device to request transmission of said one or more specified portions of the trace data.

25. A non-transitory recording medium storing a computer program for controlling a computer to perform the method of claim 22.

26. A diagnostic apparatus for processing trace data transmitted from a trace data capture device, comprising:
  issuing circuitry to issue a source identifying data request to the trace data capture device over a second interface of the trace data capture device, the trace data capture device also having a first interface to receive trace data captured from a data processing apparatus, where said data processing apparatus is a separate device from said trace data capture device, said diagnostic apparatus is a separate device from said trace data capture device, and said second interface has a smaller bandwidth than said first interface;
  receiving circuitry to receive from the trace data capture device via the second interface, in response to the source identifying data request, source identifying data indicative of which source identifiers were detected for at least one portion of trace data captured by the trace data capture device from a data processing apparatus, the source identifiers identifying which of a plurality of trace sources of the data processing apparatus generated the trace data,
  wherein the source identifying data is received without receiving the trace data; and
  processing circuitry to perform processing of the source identifying data, and in dependence on said processing of the source identifying data, to control transmission of a trace data request to the trace data capture device to request transmission of at least some of the trace data via the second interface.

\* \* \* \* \*